United States Patent [19]

Hayakawa et al.

[11] Patent Number: 4,930,213
[45] Date of Patent: Jun. 5, 1990

[54] SYSTEM FOR TRANSFERRING VEHICLE BODY FROM A COATING STATION TO AN ASSEMBLY LINE AND AN OVERHEAD CONVEYOR

[75] Inventors: Hiroshi Hayakawa; Hiroaki Maenishi; Kazuo Okamoto, all of Hiroshima, Japan

[73] Assignee: Mazda Motor Corporation, Hiroshima, Japan

[21] Appl. No.: 184,575

[22] Filed: Apr. 21, 1988

[30] Foreign Application Priority Data

Apr. 24, 1987 [JP] Japan .................. 62-101444
Apr. 24, 1987 [JP] Japan .................. 62-101445

[51] Int. Cl.⁵ .......................................... B23P 19/00
[52] U.S. Cl. ...................................... 29/793; 29/426.3; 29/430; 29/824; 198/470.1
[58] Field of Search ............. 29/430, 793, 458, 426.3, 29/712, 786, 822, 824, 714, 33 K; 198/470.1, 345, 378

[56] References Cited

U.S. PATENT DOCUMENTS

| | | | |
|---|---|---|---|
| 4,589,184 | 5/1986 | Asano et al. ........................ | 29/430 |
| 4,589,199 | 5/1986 | Ohtaki et al. ...................... | 29/430 X |
| 4,609,093 | 9/1986 | Taketani et al. ................... | 29/430 X |
| 4,646,915 | 3/1987 | Ohtaki et al. ...................... | 29/430 X |
| 4,736,515 | 4/1988 | Catena ............................... | 29/430 X |

FOREIGN PATENT DOCUMENTS 43693 of 1981 Japan .
22053 of 1984 Japan .

Primary Examiner—Charlie T. Moon
Attorney, Agent, or Firm—Gerald J. Ferguson, Jr.

[57] ABSTRACT

When transferring a vehicle body which is through with coating to a hanger of an overhead conveyor of a vehicle body assembly line, doors are first removed from the vehicle body and thereafter the vehicle body with the doors removed is transferred to the hanger.

12 Claims, 6 Drawing Sheets

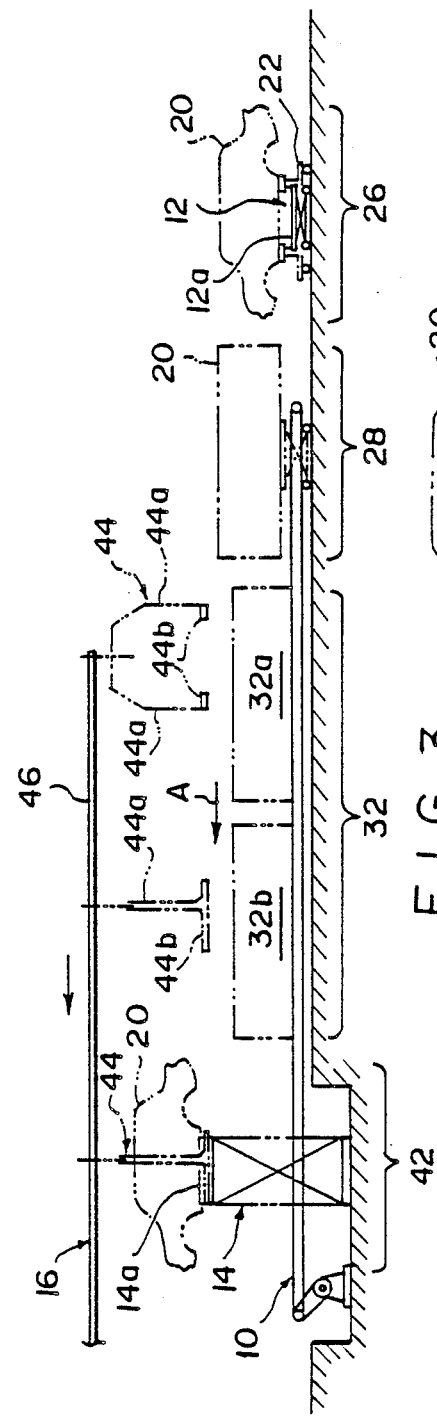
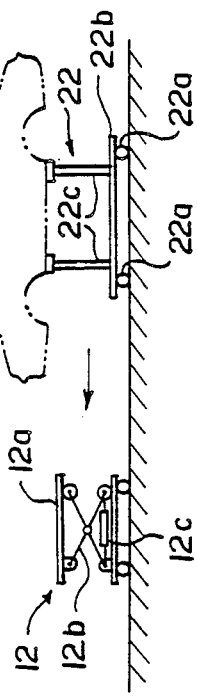
FIG. 2
FIG. 3

FIG.4
FIG.5
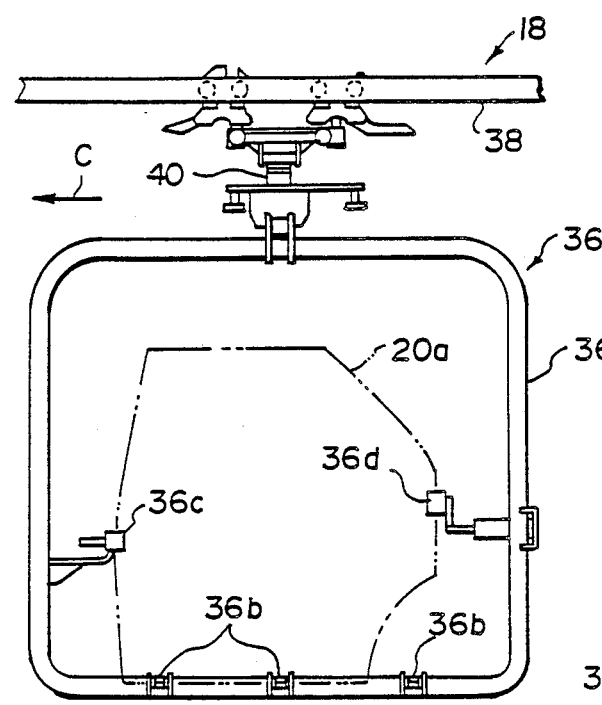
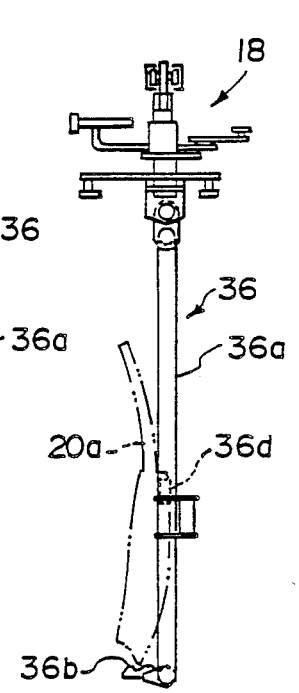

SYSTEM FOR TRANSFERRING VEHICLE BODY FROM A COATING STATION TO AN ASSEMBLY LINE AND AN OVERHEAD CONVEYOR

BACKGROUND OF THE INVENTION

1. Field of the Invention

This invention relates to a method of and a system for transferring a vehicle body to an overhead conveyor, and more particularly to a method of and a system for transferring a vehicle body which is through with the coating step to an overhead conveyor in a vehicle assembly line.

2. Description of the Prior Art

In assembly of a vehicle, a vehicle through the coatig step is generally conveyed from a coating line to a vehicle assembly line placed on a carriage, the vehicle body on the carriage is transferred to an overhead conveyor in the vehicle assembly line, and the vehicle body is equipped while it is conveyed by the overhead conveyor.

In such a vehicle assembly line, a conveyor provided with a hanger 2 having front and rear support arms 2a and 2b, as shown in FIG. 9, which are positioned on the front side and the rear side of the vehicle body 1 to support the lower side of the side sill of the vehicle body 1 has been used as the overhead conveyor. (For example, see Japanese Patent Publication No. 56(1981)-43963.)

However, recently, automation has been sharply promoted in the vehicle assembly line, and for example, the windowpanes of the windshield and the rear window come to be mounted by robots. The robots for mounting the windowpanes are disposed on the side of the assembly line, and when mounting the windowpanes, the robots stretches arms from the side of the assembly line. In the case of the conventional hanger 2 having the front and rear support arms 2a and 2b, the front and rear support arms 2a and 2b are positioned on the side of the windshield and the rear window of the vehicle body supported by the hanger 2, and the arms of the robots interferes with the support arms 2a and 2b upon mounting of the windowpanes. This gives rise to problems in automating mounting of the windowpanes.

In order to overcome such problems, it has been proposed as disclosed in Japanese Unexamined Utility Model Publication No. 59(1984)-22053 to use an overhead conveyor provided with an inverted-T-shaped hanger comprising a single vertical support arm and a horizontal support member which is fixed to the lower end of the vertical support arm to extend horizontally and supports the side sill of the vehicle body. In the inverted-T-shaped hanger, the vertical support arm is positioned on the side of the center pillar of the vehicle body, and no support arm exists on the side of the front and rear windows, and accordingly, windowpane mounting operation by the robots cannot be interfered with, thereby facilitating automation of the assembly line.

In the vehicle assembly line, there is sometimes employed "after-door-mounting system" in which the doors are once removed from the coated vehicle body, the doors and the vehicle body are separately equipped in separate lines, and the doors are thereafter mounted on the body again.

In the case the after-door-mounting system is emloyed, conventionally, the vehicle body through with the coating step is once transferred to the overhead conveyor in the assembly line, and after the overhead conveyor is lowered, the doors are removed from the vehicle body on the overhead conveyor.

However, in the case of the inverted-T-shaped hanger, the supporting arm in the side of the center pillar interferences with the door upon removal of the door, particularly in the case of two-door or three-door type vehicles, unlike the aforesaid hanger 2 having the front and rear support arm 2a and 2b spaced from each other before and after the door.

Accordingly, in order to further promote automation of the vehicle assembly line, it is preferred that the overhead conveyor having the inverted-T-shaped hanger be used in the assembly line while facilitating removal of the doors.

SUMMARY OF THE INVENTION

In view of the foregoing observations and description, the primary object of the present invention is to provide a method of and a system for transferring a vehicle body to an overhead conveyor which can meet the demand described above.

In accordance with one aspect of the present invention, there is provided a method of transferring a vehicle body which is through with coating to a hanger of an overhead conveyor of a vehicle assembly line, characterized by having steps of removing doors from the vehicle body and thereafter transferring the vehicle body with the doors removed to the hanger.

In accordance with another aspect of the present invention, there is provided a system for transferring a vehicle which is through with coating to a hanger of an overhead conveyor of a vehicle assembly line characterized by having a vehicle body conveying means which conveys the vehicle body along a predetermined conveying path while supporting the lower side of the vehicle body, a door removing station which is provided on the vehicle body conveying path and at which the vehicle body is removed with one or more door thereof, and a vehicle body transferring means which is disposed downstream of the door removing station and transfers the vehicle body removed with the door(s) to the hanger of the overhead conveyor of the vehicle assembly line.

BRIEF DESCRIPTION OF THE DRAWINGS

FIG. 2 is a schematic front view showing the double slat conveyor employed in the system shown in FIG. 1, FIG. 3 is a front view for illustrating transfer of the vehicle body to the first lifter transferring station by the carriage in the system, FIGS. 4 and 5 are front and side views, respectively, showing the door hanger of the overhead conveyor of the door equipping line.

DESCRIPTION OF THE PREFERRED EMBODIMENT

Figure 1:
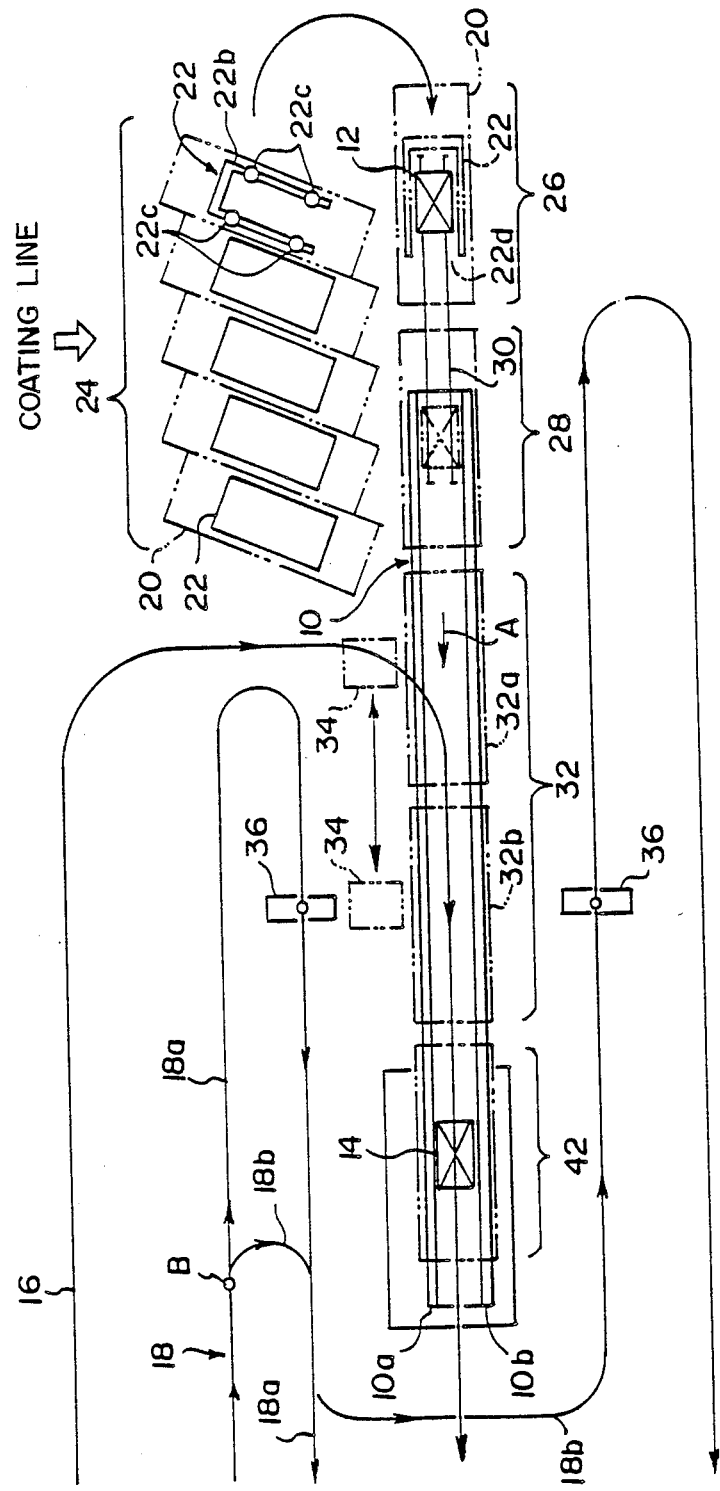
FIG. 1 is a schematic view showing a vehicle body transferring system in accordance with an embodiment of the present invention.

An embodiment of the present invention which is for transferring coated vehicle bodies to a vehicle assembly line which is adapted to equip different kinds of vehicle bodies conveyed mingled together will be described, hereinbelow. In FIGS. 1 and 2, the vehicle body transferring system of this embodiment includes a double slat conveyor 10, and a coated vehicle body 20 conveyed by a carriage 22 is once transferred to the double slat conveyor 10 by a first lifter 12 at a first lifter transfer station 26 disposed on the upstream side end portion of the conveying path of the double slat conveyor 10 (The conveying direction of the conveyor 10 is shown by arrow A.) and then transferred to an inverted-T-shaped hanger 44 by a second lifter 14 at a second lifter transfer station 42 disposed on the downstream side portion end of the conveying path of the double slat conveyor 10 after the doors are removed from the vehicle body on the double slat conveyor 10. Along the double slat conveyor 10, are provided an overhead conveyor 16 having said inverted-T-shaped hanger 44 for the vehicle assembly line and an overhead conveyor 18 having a door hanger 36 for a door equipping line. Near the upstream side end of the double slat conveyor 10 is provided a vehicle body pool 24 for pooling a plurality of vehicle bodies 20 carried from a coating line (not shown) on carriages 22.

Different kinds of vehicle bodies 20 which are through with coating are first conveyed to the vehicle body pool 24 carried by the carriages 22.

The vehicle bodies 20 pooled in the pool 24 are conveyed by the carriages 22 to the first lifter transfer station 26 one by one in the order corresponding to the assembling order in the assembly line, and transferred to the first lifter 12 at the first lifter transfer station 26.

The carriage 22, as shown in FIGS. 1 and 3, comprises a U-shaped base 22b which opens forward at the front end 22d thereof and is provided with wheels 22a, and four support posts 22c fixed to the base 22b to extend upward two on each side of the base 22b, and is hollow at the center. The support posts 22c support the left and right side sills of the vehicle body.

The first lifter 12 has a support plate 12a for supporting the lower side of the floor of the vehicle body 20. The support plate 12a is supported to be movable up and down by a pantograph type link mechanism 12b and a hydraulic cylinder 12c. The size of the first lifter 12 is selected so that the first lifter 12 can enter the center of the carriage 22 from the front end 22d of the carriage 22. Rails 30 for the first lifter 12 is provided to extend between the first lifter transfer station 26 and the double slat conveyor transfer station 28 (to be described later). The first lifter 12 is self-propelled back and forth between the stations 26 and 28.

At the first lifter transfer station 26, the first lifter waits with its support plate 12a held in the lower position as shown in FIG. 2, and the carriage 22 is moved toward the first lifter 12 until the lifter 12 is received in the hollow central portion of the carriage 22. Then the support plate 12a is moved upward to lift the vehicle body 20 from the carriage 22, and then the first lifter 12 runs on the rails 30 to carry the vehicle body 20 to the double slat conveyor transfer station 28. The carriage 22 is moved to a predetermined position by a worker, a cylinder pusher or other suitable means after the vehicle body 20 is removed therefrom.

The double slat conveyor 10 comprises left and right slat conveyors 10a and 10b disposed in parallel at a predetermined distance from each other. The left and right slat conveyors 10a and 10b intermittently conveys the vehicle body 20 while respectively supporting the left and right side sills of the vehicle body 20.

Said double slat conveyor transfer station 28 is positioned at the upstream side end of the double slat conveyor 10, and the rails 30 for the first lifer 12 extend up to between the left and right slat conveyors 10a and 10b. The first lifter 12 carrying thereon the vehicle body 20 is stopped in the position shown by the chain line at the double slat conveyor transfer station 28 and then the support plate 12a is lowered with the vehicle body 20 left on the double slat conveyor 10. Then the first lifter 12 returns to the first lifter transfer station 26.

The vehicle body 20 transferred to the double slat conveyor 10 is intermittently conveyed, and sent to a door removing station 32 disposed on the conveying path of the conveyor 10 downstream of the double slat conveyor transfer station 28. At the door removing station 32, the vehicle body 20 is stopped in first and second positions 32a and 32b from the upstream side. In the first position 32a, the doors are removed from the vehicle body 20, and in the second position 32b, the doors removed from the vehicle body 20 are transferred to the door hanger 36 of the overhead conveyor 18 for the door equipping line. For example, a carriage-like jig 34 which has a door support portion movable up and down and can be fixed to the double slat conveyor 10 to be moved together therewith is prepared (FIG. 1). The jig 34 is fixed to the conveyor 10 in a position opposed to the door when the vehicle body 20 is stopped in the first position 32a, and the door is opened and demounted to be supported on the door support portion of the jig 34 the position of which has been adjusted to support the lower side of the opened door. Thereafter, the vehicle body 20 and the jig 34 are conveyed to the second position 32b, and in this position, the door on the jig 34 is transferred to the door hanger 36 stopped on the side of the jig 34. After the door is transferred to the door hanger 36, the jig 34 is moved away from the conveyor 10.

The overhead conveyor 18 for the door equipping line is branched into two branch lines 18a and 18b at a junction B. The branch lines 18a and 18b extends along the double slat conveyor 10 respectively on the right and left side thereof. At the junction B, the door hangers 36 are fed alternately to the branch lines 18a and 18b to convey the right and left doors removed from the vehicle body 20. Though the description has been made only on removal and transfer of the right door, removal and transfer of the left door are carried out in the same manner using the same jig (not shown).

As shown in FIGS. 4 and 5, the overhead hanger 18 for the door equipping line has the door hanger 36 as described above. In FIG. 5, arrow C shows the conveying direction of the door hanger 36. The door hanger 36 is suspended from a rail 38 and intermittently run by a driving means such as a chain (not shown). The door hanger 36 comprises a substantially rectangular frame 36a, a door support portion 36b formed on the lower side of the frame 36a, a fixed clamper 36c provided on one of the vertical sides of the frame 36a to clamp a side of the door 20a, and a continuously adjustable clamper 36d provided on the other vertical side of the frame 36a to clamp a side of the door 20a. The clamps 36c and 36d clamps the door 20a by way of resilient pads such as of rubber not to damage the door 20a. The continuously adjustable clamp 36d may be such as an air clamper which is stopped and held there when predetermined load acts thereon. By the use of such a clamper, various kinds of doors can be handled. The hanger 36 is rotatable about a suspending shaft 40 by 90° and, for example, when transferring the door 20a, the hanger 36 is rotated by 90° from the position shown in FIG. 4.

After removal of the door 20a and transfer of the door 20a to the door hanger 36, the vehicle body 20 is transferred to the second lifter transfer station 42. The second lifter transfer station 42 is provided on the downstream side end portion of the double slat conveyor 10. At the station 42, there is provided between the left and right slat conveyors 10a and 10b a second lifter 14 for transferring the vehicle body 20 removed with the doors 20a to the inverted-T-shaped hanger 44. The second lifter 14 has a support plate 14a which is adapted to support the lower side of the floor of the vehicle body 20 and is movable up and down.

The second lifter 14 waits for the vehicle body 20 to be conveyed to the second lifter transfer station 42 with the support plate 14a being held lower than the upper surface of the double slat conveyor 10, or more strictly, lower than the lower side of the floor of the vehicle body 20. When the vehicle body 20 is stopped at the second lifter transfer station 42, the support plate 14a is moved upward to lift the vehicle body 20 to a position where the lower side of the side sill of the vehicle body is positioned higher than the upper surface of a support member 44b of the inverted-T-shaped hanger 44 to be described later.

Since the support plate 14a must be moved up and down by a substantial distance and at the same time, when the support plate 14a is positioned lower than the double slat conveyor 10, the whole second lifter 14 must be positioned lower than the double slat conveyor 10 not to interfere with the vehicle body 20 when it is transferred into the second lifter transfer station 42, the up-and-down mechanism for the support table 14a of the second lifter 14 must be selected taking into account such conditions. For example, an up-and-down mechanism utilizing a hydraulic cylinder can be used.

The conveying path of the overhead conveyor 16 for the vehicle body assembly line is set so that the inverted-T-shaped hanger 44 runs along the double slat conveyor 10 above the longitudinal center of the conveyor 10. The overhead conveyor 18, as shown in FIGS. 1 and 2 and 6 to 8, comprises a rail 46 and the aforesaid inverted-T-shaped hanger 44 intermittently driven along the rail 46 by a suitable driving means such as chain (not shown). The inverted-T-shaped hanger 44 comprises a pair of vertical support arms 44a each positioned on one side of the vehicle body 20, and a pair of horizontal support members 44b fixed to the lower ends of the respective support arms 44a. Each of the support member 44b has three side sill receiving portions 44c, 44d and 44e. The foremost first side sill receiving portion 44c is stationary while the second and third side sill receiving portion 44d and 44e are rotatable by 90°. The first side sill receiving portion 44c is used for all kinds of the vehicle bodies while the second and third side sill receiving portions 44d and 44e are selectively rotated by suitable means to the operative position according to the kind of the vehicle body 20 to be conveyed.

The hanger 44 is conveyed in parallel to the conveying direction of the double slat conveyor 10 and is stopped at the second lifter transfer station 42 where the vehicle body 20 waits lifted by the second lifter 14 and the support member 44b, particularly, the side sill receiving portions 44d to 44e of the support member 44b are positioned below the side sill of the vehicle body 20. Then by lowering the support plate 14a of the second lifter 14, the vehicle body 20 is transferred to the hanger 44 with the side sill resting on the side sill receiving portions of the support member 44b.

The vehicle body 20 transferred to the hanger 44 is equipped with various parts while it is conveyed along the vehicle assembly line, and thereafter the doors 20a which are equipped in the door equipping line are mounted on the vehicle body. Subsequently, the assembled vehicle is transferred to, for instance, a floor conveyor and is subjected to various tests.

Figure 6:
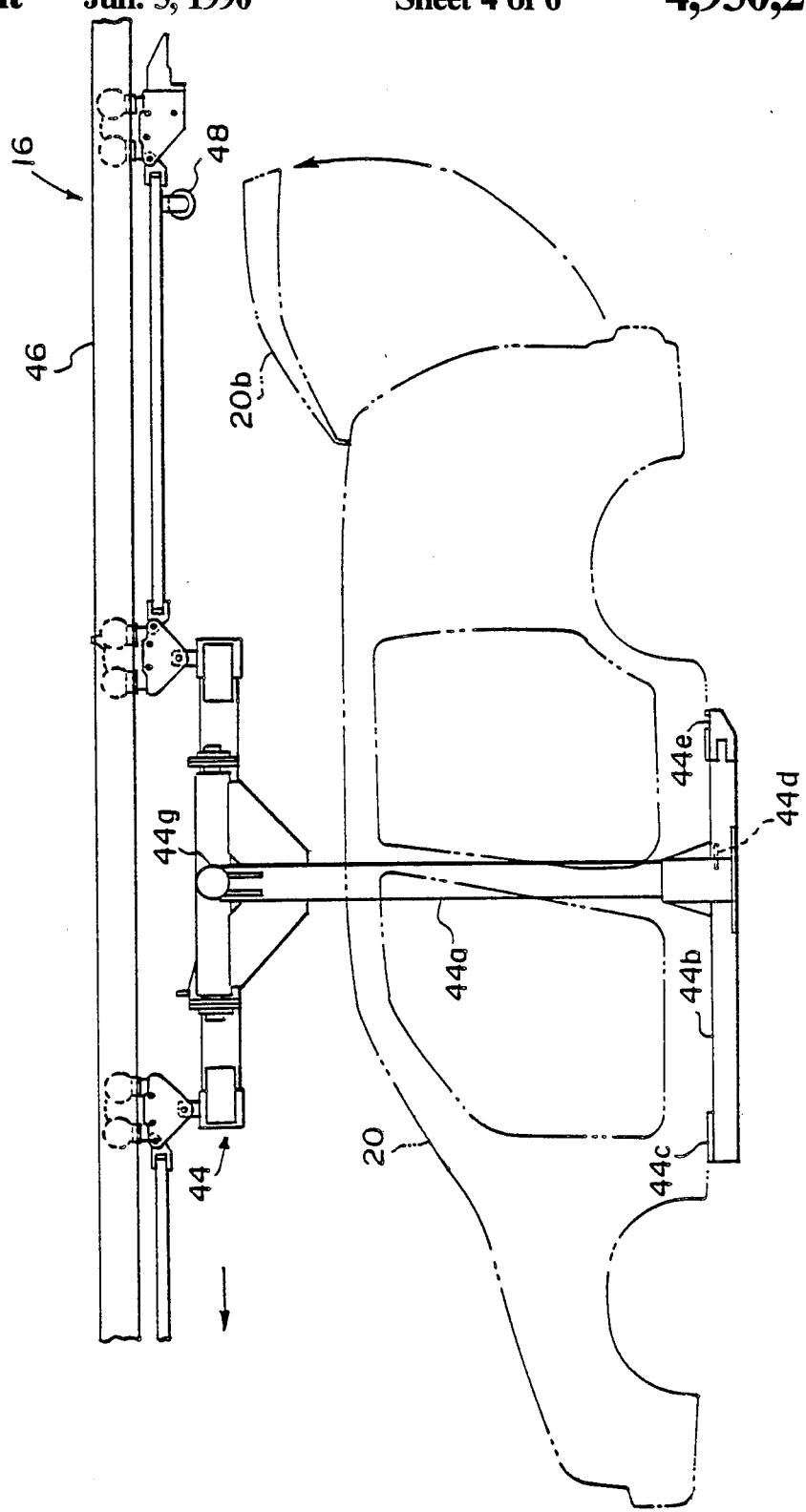
FIG. 6 is a front view showing the inverted-T-shaped hanger of the overhead conveyor of the vehicle assembly line.
Figure 7:
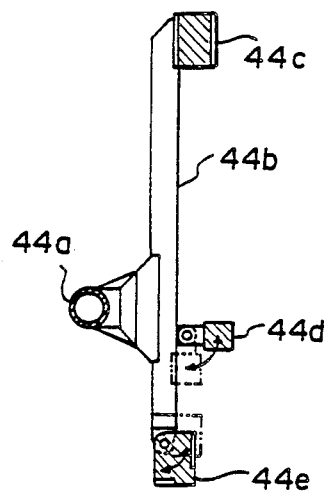
FIG. 7 is a cross-sectional view taken along line VII—VII in FIG. 8.
Figure 8:
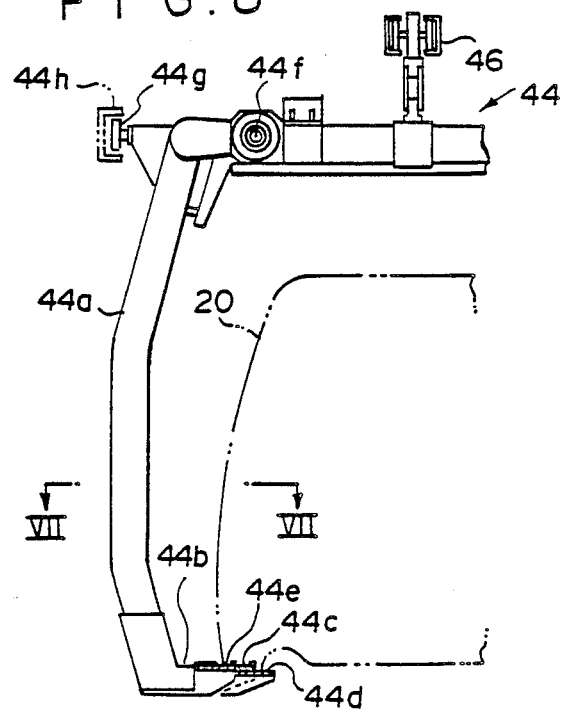
FIG. 8 is a fragmentary side view of the inverted-T-shaped hanger.
Figure 9:
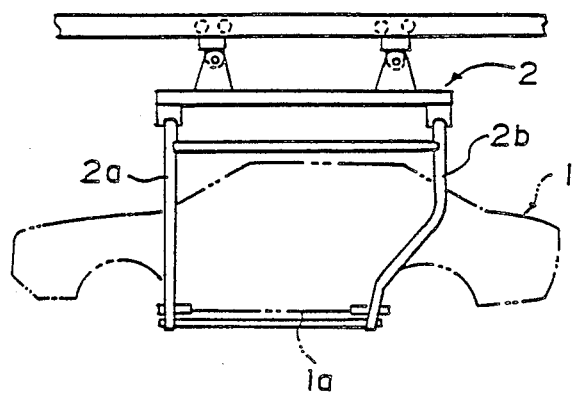
FIG. 9 is a view showing the hanger conventionally used in the vehicle assembly line.

Since the vehicle body 20 is intermittently conveyed by the hanger 44, there is a possibility that a rear door 20b spring-urged to open swings upward as shown in FIG. 6. In order to prevent damage on the rear door 20b in such a case, the overhead conveyor 16 is provided with a stopper roll 48 having a soft material such as rubber on the outer surface thereof.

In order to transfer the vehicle body 20 to the floor conveyor or the like, the left and right support arms 44a must be opened left and right. For this purpose, each support arm 44a is arranged to be swingable about a shaft 22f and is provided with a roller 44g in engagement with a rail 44h. By bending upward the rail 44h where the vehicle body 20 to be transferred to the floor conveyor, the arms 44a are swung apart from each other.

We claim:

1. A system for transferring a vehicle body from a coating station to an assembly line comprising:
    a first vehicle body conveying means for supporting a lower portion of the vehicle body and conveying the vehicle body along a conveying path;
    a second overhead vehicle body conveying means including a hanger having at least one vertical arm means positioned substantially at the center of a side of the vehicle body and a support portion for supporting said lower portion of the vehicle body;
    a door removing station positioned along said first vehicle body conveying means for removing at least one door from said vehicle body before the vehicle body is positioned on said second overhead vehicle body conveying means; and
    a vehicle body transferring means disposed downstream of said door removing station for transferring the vehicle body from said first vehicle conveying means to said second overhead vehicle conveying means;
    wherein said door is removed from the vehicle body without the interference of either said first vehicle body conveying means or said second overhead vehicle conveying means.

2. A system as defined in claim 1 in which said overhead conveyor has two vertical arm means each positioned substantially at the center portion of one side of the vehicle body to be conveyed by the overhead conveyor.

3. A system as defined in claim 1 in which only the door removing station is provided on the vehicle body conveying path of said first vehicle body conveying means.

4. A system as defined in claim 1 further comprising a second transferring station disposed downstream of said door removing station.

5. A system as defined in claim 1 in which said door removing station has a station in which the door is removed from the vehicle body and a station in which the removed door is transferred to a hanger.

6. A system as defined in claim 4 in which said coated vehicle body is transferred from a vehicle pool to said first vehicle body conveying means through said second transferring station.

7. A system as defined in claim 1 in which said first vehicle body conveying means is a slat conveyor having a transfer station upstream of said door removing station for transferring the vehicle body after being coating.

8. A system as defined in claim 7 in which said slat conveyor is a double slat conveyor comprising a pair of slat conveyors spaced from each other to permit a carriage conveyed to the transfer station while supporting the lower side of the vehicle body to be positioned therebetween.

9. A system as defined in claim 1 further comprising a pair of door conveyors which are disposed on opposite sides of said conveying path of said first vehicle body conveying means and convey the doors removed from the vehicle body to a door equipping station.

10. A system as defined in claim 1 in which said overhead conveyor has two vertical arm means each positioned on one side of the vehicle body to be conveyed by the overhead conveyor each having a support portion which is connected to each vertical arm means said support portions being adapted to support a variety of vehicle bodies different in shape.

11. A system as defined in claim 10 said support portion comprising a plurality of side sill receiving portions capable of being rotated in a horizontal plane by 90° to be moved between an operative position and an inoperative position according to the kind of the vehicle body.

12. A system as defined in claim 11 further comprising a door conveyor which is disposed near the door removing station said door conveyor having a hanger for holding the door removed from the vehicle body and equips the door, the hanger being provided with a door support means the position of which can be adjusted according to the kind of the door.

* * * * *